United States Patent
Biemond et al.

(10) Patent No.: US 11,402,404 B2
(45) Date of Patent: Aug. 2, 2022

(54) SCANNING PROBE MICROSCOPE AND A METHOD FOR OPERATING THEREOF

(71) Applicant: Nederlandse Organisatie voor toegepast-natuurwetenschappelijk onderzoek TNO, 's-Gravenhage (NL)

(72) Inventors: Jan Jacobus Benjamin Biemond, Barendrecht (NL); Lukas Kramer, Berkel en Rodenrijs (NL); Jasper Winters, Nieuw-Vennep (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 0 days.

(21) Appl. No.: 17/266,066

(22) PCT Filed: Aug. 8, 2019

(86) PCT No.: PCT/NL2019/050524
§ 371 (c)(1),
(2) Date: Feb. 4, 2021

(87) PCT Pub. No.: WO2020/032800
PCT Pub. Date: Feb. 13, 2020

(65) Prior Publication Data
US 2021/0311090 A1    Oct. 7, 2021

(30) Foreign Application Priority Data
Aug. 8, 2018 (EP) .................................... 18187891

(51) Int. Cl.
*G01Q 10/06*    (2010.01)
*G01Q 60/34*    (2010.01)
*G01Q 60/36*    (2010.01)

(52) U.S. Cl.
CPC .......... *G01Q 10/065* (2013.01); *G01Q 60/34* (2013.01); *G01Q 60/363* (2013.01)

(58) Field of Classification Search
CPC .................................................. G01Q 10/065
See application file for complete search history.

(56) References Cited

U.S. PATENT DOCUMENTS

2008/0277582 A1* 11/2008 Shi ...................... G01Q 10/065
                                                    73/105
2013/0110262 A1    5/2013 Abramovitch et al.
2018/0217180 A1*  8/2018 Sivan .................... G01Q 10/065

FOREIGN PATENT DOCUMENTS

WO    WO 2008/027601 A2    3/2008
WO    WO 2017/033187 A1    3/2017

OTHER PUBLICATIONS

European Patent Office, International Search Report in corresponding International Application No. PCT/NL2019/050524, dated Oct. 22, 2019 (2 pages).

* cited by examiner

Primary Examiner — Eliza W Osenbaugh-Stewart
(74) Attorney, Agent, or Firm — Leydig, Voit & Mayer, Ltd.

(57) ABSTRACT

A method of operating a scanning probe microscope, wherein a control loop is provided which is configured for controlling one or more feedback parameters of the scanning probe microscope. One or more system identification measurements are performed during operation of the control loop, wherein during the one or more system identification measurements an excitation signal with a plurality of frequency components is introduced in the control loop and a resulting response signal indicative of a cantilever displacement or a stage-sample distance between a sensor device and a sample is measured. A model response function is identi- (Continued)

fied using said excitation signal and said resulting response signal, wherein one or more settings and/or input signals are adapted in the control loop based on the identified model response function. The scanning probe microscope is used for characterization of the sample using the adapted one or more settings and/or input signals.

19 Claims, 11 Drawing Sheets

SCANNING PROBE MICROSCOPE AND A METHOD FOR OPERATING THEREOF

CROSS-REFERENCE TO RELATED APPLICATIONS

This patent application is a U.S. National Phase of PCT International Application No. PCT/NL2019/050524, filed Aug. 8, 2019, which claims priority to European Application No. 18187891.9, filed Aug. 8, 2018, which are both expressly incorporated by reference in their entireties, including any references contained therein.

FIELD OF THE INVENTION

The invention relates to a method for operating a scanning probe microscope. Further, the invention relates to a scanning probe microscope. The invention also relates to a lithographic apparatus.

BACKGROUND TO THE INVENTION

A scanning probe microscope (SPM) is widely used for metrology and sample characterization in industrial application. However, an efficient control of these systems may be challenging as certain control conditions can vary over time resulting in sub-optimal control. The throughput and reliability can be problematic for current scanning probe microscopes, and often a skilled operator is required to operate the scanning probe microscope.

Tuning of operational and/or controller parameters is typically performed manually. For instance, an operator of a scanning probe microscope, such as an atomic force microscope (AFM), may manually increase a certain controller parameter and/or other controller settings when a control instability is detected. It may require specialized knowledge in order to be able to accurately predict the effect of adjustments of the controller parameters on the operation of the scanning probe microscope. In some cases the skilled operator manually tunes the control loop or control system for a given sample based on a quality of measurement/characterization of a sample while scanning for example a lateral location at the sample. Furthermore, after the regularly needed probe changes and/or sample changes, the skilled operator may have to manually adapt the tuning and restart the scan. Such manual fine-tuning of the controller parameters can be cumbersome, limits throughput and may induce undesired operator-dependency in the measurement results.

The existing control techniques for scanning probe microscopes are far from optimal in terms of measurement precision, reliability and throughput. There is a need to improve the operation of a scanning probe microscope. Furthermore, there is a desire that the tuning of control loops in scanning probe microscopes is enhanced.

SUMMARY OF THE INVENTION

It is an object of the invention to provide for a method and a system that obviates at least one of the above mentioned drawbacks.

Additionally or alternatively, it is an object of the invention to improve the control of the scanning probe microscope.

Additionally or alternatively, it is an object of the invention to obtain a more efficient and/or cost-effective control of the scanning probe microscope during operation.

Thereto, the invention provides for a method of operating a scanning probe microscope wherein a control loop is provided which is configured for controlling one or more feedback parameters of the scanning probe microscope, wherein the scanning probe microscope comprises a sensor device including a cantilever having a probe tip, wherein the scanning probe microscope includes at least one stage actuator for actuating at least one of an object stage or sensor stage in order to vary a relative distance between the sensor device and a sample, and wherein a controller is provided with one or more control parameters configured to control the at least one stage actuator for keeping the sample at a desired distance with respect to the cantilever, the method including: performing one or more system identification measurements during operation of the control loop, wherein during the one or more system identification measurements an excitation signal with a plurality of frequency components is introduced in the control loop and a resulting response signal indicative of a cantilever displacement or a stage-sample distance between the sensor device and the sample is measured, wherein a model response function is identified using said excitation signal and said resulting response signal; and adapting one or more settings and/or input signals in the control loop based on the identified model response function, wherein characterization of the sample by means of the scanning probe microscope is performed using the adapted one or more settings and/or input signals.

A response function can be determined using the excitation signal (cf. input) and the resulting response signal corresponding to a measured controlled value (cf. output). The identified response function can provide sufficient information for effectively tuning the controller or control parameters of the controller, and/or other input signals of the control loop, such as for instance the actuation signal for actuating the cantilever. By means of system identification an improved control can be obtained. Adjustment of control parameters can be automated using tuning algorithms that take the model, which is obtained by means of the system identification, as input. In this way, for a given system with a certain controller structure, the control parameters can be chosen and optimized for maximizing the controller performance while an operation of the controller remains stable. In addition, possible performance-enhancing functionalities in the control computation can be enabled, disabled or optimized based on said system identification.

The scanning probe microscope (SPM) may be an atomic force microscope (AFM) which can for instance be operated in different AFM modes. The system identification measurements can be performed for the control loops linked to the selected SPM/AFM modes.

The predetermined excitation signal can be an external input signal which is added to the control signal in order to determine or estimate how the system responds to other input signals in the control loop. The controller settings can be changed based on the characterization of the behavior of the system to input signals including the added excitation signal. The predetermined excitation signal allows for an improved characterization of the behavior of the system to other input signals. The predetermined excitation signal may be a known signal and/or a measured signal, for example externally added to the control loop.

Optionally, the predetermined excitation signal includes at least 100 frequency components. The response of the system to the individual frequency components can be determined in order to identify how the system behaves to said frequency components.

Detailed system information can be determined by means of the system identification measurements, wherein the response to the sample at hand is identified during the scan and the sample variation is also taken into account. Measuring the Frequency Response Function (FRF) by inserting known external signals over a broad frequency range attains more complete system information. This enhanced information allows enhanced tuning of the control loop. An automated tuning may allow for optimizing more control parameters such that better performance is achieved, as human operators may not be able to optimize too many parameters where the effect is coupled between the parameters. Manual tuning of SPM may be hampered by instabilities that are excited by local sample variations. This effect makes optimal tuning harder.

Advantageously, intrinsic variations in the samples, probes (which may be replaced), and tasks are such that tuning of the control loop parameters may be needed. According to the invention system identification measurements are carried out during operation of the control loop. Advantageously, this can be done without big throughput limitation, for each task, probe and sample. Additionally or alternatively, it is possible to provide a broad spectrum of external input signals.

Optionally, during a first system identification measurement, a first excitation signal with a plurality of frequency components is added downstream of the controller at a controller output signal, and wherein a first model response function is identified using the added first excitation signal and a measured first response signal indicative of the distance between the sensor device and the sample, wherein the one or more control parameters of the controller are adjusted based on the identified first model response function obtained by the first system identification measurement.

The control parameters of the controller can be selected based on the response function obtained by means of the one or more system identification measurement.

In some examples, the controller has an input and an output. The input from the controller can be an estimate of the distance between a stage and the sample. This estimate of the stage-sample distance can be compared with a desired distance. In some examples, the desired distance is subtracted from the estimate of the stage-sample distance. Advantageously, by changing the controller parameters based on the identified response function, the controller can more quickly respond to a certain sample error.

Optionally, the scanning probe microscope is provided with an object stage for holding a sample, a sensor stage for holding a sensor device which includes a cantilever having a probe tip, at least one stage actuator configured to actuate at least one of the object stage or the sensor stage in order to vary a distance between the sensor device and the sample, wherein the controller is configured to control the at least one stage actuator for keeping the sample at a desired distance with respect to the cantilever.

The output of the controller can provide a signal which is provided to the at least one stage actuator to move at least one of the object stage or the sensor stage (e.g. Z-stage) away or towards the sample profile. The controller may for example determine an output signal which can adjust the object stage and/or sensor stage in order to obtain a desired distance between the cantilever and the sample. The desired position of the object stage or sensor stage can be defined by the mode in which the AFM is set and which probe tip movements are to be performed for scanning the sample.

A known excitation signal with a plurality of frequency components is used for system identification measurements. The signal may be predefined and/or measured after generation in order to more accurately identify it. It is also possible that the signal is generated by means of a signal generator. In some advantageous examples, a noise signal (e.g. white noise) is generated an used as excitation signal for the system identification measurements. In some examples, the generated noise is also measured in order to be able to compare the injected signal to the output signal. Other injected excitation signals may also be used. The injected signal (cf. input) can be compared to a signal indicative of a controlled quantity (cf. output) in order to determine to what extent the signals correlate to each other. The correlation between the excitation/input signal and the output is determined by the system-dependent response function, and can follow the shift of the dynamics of the system. Advantageously, the identified knowledge about the dynamics of the system can be used for example for changing control parameters of the controller, allowing an automated control not requiring an operator with expert knowledge for this task to perform manual adjustments to control parameters of the controller.

Optionally, the one or more control parameters of the controller are adjusted based on the identified response function using numerical optimization. The control problem can be expressed as a mathematical optimization problem for finding the controller that solves the optimization. Different methods can be used for the optimization problem. An exemplary method is the H-infinity method in which a controller is determined to achieve stabilization with guaranteed performance.

The at least one stage actuator can be controlled by means of the controller for keeping the sample and the cantilever at a desired relative distance with respect to each other. This can be done by means of a control algorithm (e.g. either constant or time-varying signal).

Optionally, the method further includes providing a periodic actuation signal to the sensor device using a probe actuator for inducing periodic movement between the probe tip and the sample during scanning of a surface of the sample with the probe tip, wherein during a second system identification measurement a second excitation signal with a plurality of frequency components is added downstream of the probe actuator at an actuator output signal of the probe actuator, and wherein a second model response function is identified using the added second excitation signal and a measured second response signal indicative of a displacement of the probe tip of the sensor device, wherein the identified second model response function is used for adapting the actuation signal provided to the sensor device for characterization of the sample.

Additionally or alternatively, one or more system identification measurements may be performed for better characterizing the response of the cantilever. The identified response function can effectively reveal how the cantilever reacts when it is actuated (e.g. vibrated). Hence, in this way it can be better assessed how the cantilever responds to external vibrations or what signal is optimal for the induced motion between probe tip and sample.

By means of the first system identification measurement, the stage controller can be set with optimal controller parameters. Furthermore, the second system identification measurement enables an optimal shaping of the actuator output signal provided to the probe actuator for inducing periodic movement between the probe tip and the sample. Therefore, the different system identification measurements for the stage controller (e.g. electrical excitation signal injected behind the controller in the control loop) and the cantilever actuation (e.g. electrical excitation signal injected behind the function generator) can be performed for different objectives. It will be appreciated that the system identification measurements may also be performed elsewhere in the control loop.

In some examples, the actuation signal coming from the signal generator is tuned using the model response function obtained by the second system identification measurement in which a second excitation signal is added to the initial actuation signal.

Optionally, the first and second model response functions are identified successively.

Optionally, the first model response and second model response are identified at least partially concurrently, wherein the first excitation signal includes frequency components up to 250 kHz, preferably up to 50 kHz, and wherein the second excitation signal includes frequency components in a range of 75 kHz to 10 MHz, preferably in a range of 100 kHz to 5 Mhz.

In some examples, different system identification measurements can be conducted at least partially simultaneously, i.e. having overlapping time periods. In this way, the time required for performing the system identification measurements can be reduced as the first and second system identification measurements can be performed at least partially in parallel. Hence, multiple simultaneous system identification measurements can be combined for determining different model response functions. For example, the first system identification measurement may be performed for identifying the first model response function, and the second system identification may be performed for identifying the second model response function, wherein the first model response function is used for adjusting one or more control parameters of the stage controller, and wherein the second model response function is used for adjusting an actuation signal (cf. an input signal in the control loop) for actuation of the sensor device. When exciting the cantilever, a higher frequency signal may be injected because it is desirable to determine how the cantilever specifically responds to it. As a result, the signal may include higher frequencies compared to the signal used for the first system identification measurements linked to the stage controller. In some examples, the first predetermined excitation signals used in the one or more first system identification measurements have frequency components smaller than (or up to) 250 kHz, more preferably smaller than 100 kHz, even more preferably smaller than 50 kHz. Since the one or more second system identification measurements relate to model analysis of the cantilever actuation, the predetermined excitation signal may include other frequencies relevant for accurately identifying the model response function. In some examples, the second predetermined excitation signals used in the one or more second system identification measurements are greater than 75 kHz, more preferably between 100 kHz to 10 MHz.

Optionally, the first excitation signal includes frequency components from 0.05 to 2 times a lowest resonance frequency of the sensor stage, and/or wherein the second excitation signal includes frequency components in a range of 0.01-10 times a first resonance frequency of the cantilever, more preferably in a range of 0.1-4 times the first resonance frequency of the cantilever.

Advantageously, the second predetermined excitation signals used in the one or more second system identification measurements can be chosen based on the resonance frequencies of the cantilever. For example, the second predetermined excitation signals may be 0.5-8 times the first natural frequency of the cantilever, more preferably between 0.1 to 4. However, other ranges are also possible.

Advantageously, the cantilever actuation and the Z-stage can be optimally controlled using the model response functions obtained using the one or more first and second system identification measurements.

Optionally, the one or more system identification measurements are employed for performing automatic tuning of the control loop which is utilized for controlling the one or more feedback parameters of the scanning probe microscope.

Advantageously, the method according to the claimed invention provides for an improved control with existing hardware of the SPM, wherein one or more excitation signals are additionally added in the control loop in order to determine one or more model response function by means of signal processing.

By means of the model response function obtained by performing system identification measurements in the control loop, the controller parameters can be adjusted automatically. Different criteria are possible for adjusting the controller parameter.

Optionally, the controller is tuned based on the identified first model response function so as to minimize a response time of the controller.

The system identification measurements enable determining the response function which can be a model of what happens in the stage-control system of the AFM. The controller in the stage-control system can be tuned based on the identified response function in such a way that the combination of the controller and the system (including probe-sample interaction) respond to disruptions as quickly as possible. The control parameters of the controller can be optimized for increasing the control speed while still remaining stable and achieving optimal measurements.

Optionally, the actuation signal is tuned based on the identified second model response function so as to minimize an error of the probe tip displacement.

Optionally, on the basis of the identified response function (e.g. frequency response function) it can be predicted when the controller becomes unstable, or becomes excessively sensitive to noise, depending on the one or more controller parameters. The one or more controller parameters can then be adjusted for increasing the performance of the controller while the controller remains stable under the changed one or more controller parameters.

Optionally, a plurality of predefined selectable control loops are provided corresponding to different operation modes of the scanning probe microscope, wherein the method includes selecting one of the plurality of predefined selectable control loops and performing the one or more system identification measurements for the selected control loop.

The invention can provide for an improved reliability, precision and throughput, as well as reduced need for skilled operators. Advantageously, the modularity of the control loop can enable different modes of operations. Furthermore, the combination of the modular architecture of the control system including a plurality of different control loops corresponding to different SPM/AFM modes, and identification of the dynamical response during operation of the control loop (e.g. dynamic response of the Z-stage and sample stage distance sensor) can provide an improved control over the operation of the AFM. In this way, the SPM can be used for high-throughput semiconductor applications. Advantageously, the invention allows application of the improved SPM in industrial environments.

A plurality of different control loops can be predefined for different AFM modes. Advantageously, for each of the AFM modes it can be determined how the control system responds to inputs by means of automated system identification measurements.

The described control loops linked to the different AFM modes can be improved by means of the one or more system identification measurements, wherein the excitation signal is injected during operation of the control loop, and the resulting response is measured for determining the model response function using said resulting response and the injected excitation signal, wherein the identified model response function is used for optimizing control settings of the controller and/or adapting input signals in the control loop.

Advantageously, different scan modes can be selected. Furthermore, various (combinations of) performance enhancing functionalities can be added independently in the control loop. Additionally, system identification (e.g. for optimization of control parameters or settings) is possible with those functionalities in place.

Optionally, the control loop is modular with a plurality of predefined modules which are upon selection activated in the control loop, and where this selection can be based on the identified response function.

Based on the identified response function, the control parameters and settings of the controller can be accurately regulated. In this way, it can be determined how the system will respond to inputs, enabling a better control. As indicated above, the system identification measurements can also be carried out when the AFM system operates in different AFM modes, and/or when different optional modules in a selected control loop are activated or deactivated.

Various control loop modules (e.g. control blocks) can be selected and added to the current control loop which can be linked to a certain SPM/AFM mode. The modules can form modular blocks for the control loop. The modules may provide for different functionalities in the control loop, and may be added independently or dependently of each other in the control loop. The system identification measurements may be carried out with the modules added to the control loop, for example for optimizing control parameters, control settings and/or input signals in the control loop. The modularity of the control loop therefore provides significant advantages in combination with the system identification measurements for providing improved control.

The combination of automated control optimization (without operator interaction) and modular control architecture enables a wider use of SPM techniques in the industry, for example applicable to semicon-industry and lithography apparatuses.

Optionally, the plurality of predefined modules include at least one of: a top-bottom intensity compensation module, a sensor stage top-bottom compensation module, a phase lock loop module configured for monitoring additional resonances, an excitation frequency correction module, a cantilever damping module or a dither gain crosstalk compensation.

Optionally, the control loop is configured to buffer an amplitude during at least one cycle of a periodic movement of the probe tip, and wherein based on the buffer the stage-sample distance is estimated.

The amplitude may for instance be indicative of a probe tip deflection. The system identification measurement can be carried out in the control loop, wherein the control loop is looped based on a buffer calculation of an amplitude estimate. Advantageously, only amplitudes may be considered which are typically high-frequency signals. As a result, there is significantly less effect of low-frequency disturbances such as drift. This allows the desired stage-sample distance to be kept constant in an improved way.

Optionally, during the at least one cycle, a largest contact force in the entire buffered period is determined, wherein the estimate of the stage-sample distance is based on the determined largest contact force.

Optionally, one or more system identification measurements are carried out after a change of at least one of the probe tip or the sample.

Advantageously, the SPM can be operated without (manual) intervention by a skilled operator after sample or probe exchange. Furthermore, the SPM system performance and reliability can be improved in this way.

Optionally, the introduced excitation signal is predetermined. In this way, in some examples, it is not required to measure the introduced excitation signal for performing the system identification measurements.

Optionally, the introduced excitation signal is a generated noise signal, chirp signal and/or multi-sine signal which is preferably also measured for use for identifying said model response function.

These introduced excitation signals may include sufficient frequency components for effective identification of the system behavior by means of the calculated model response function. Other introduced excitation signals may also be used. For example, in some embodiments, the excitation signal may include different subset of frequencies in different frequency ranges.

Optionally, the excitation signal and the resulting response signal are transformed into frequency domain, and wherein the identified model response function is a frequency response function.

The predetermined excitation signal injected for the system identification measurements known in advance and/or measured. For example, as the stage-sample distance is recorded during scanning probe microscopy (e.g. AFM), the two signals (predetermined excitation signal and recorded stage sample distance) can be used for determined the model response function. The model response function can be a frequency response function obtained by first converting the signals in the frequency domain and then dividing the stage sample distance (cf. output) by the predetermined excitation (cf. input). This can also be done for the second system identification measurement relating to the cantilever actuation, wherein for example instead a value indicative of the probe tip deflection (cf. output) is divided by the predetermined excitation (cf. input) for determining the second model response function.

Although some advantageous embodiments employ frequency-based system identification, it will be appreciated that it is not essential. The relationship between the injected signal and the outgoing signal (e.g. stage-sample position, cantilever actuation, etc.) can also be determined in other ways.

Optionally, the controller is a motion controller for a SPM. Modular compensation techniques may be employed.

According to an aspect, the invention provides for a scanning probe microscope system including a control loop configured to control one or more feedback parameters, the system comprising a sensor device including a cantilever having a probe tip, wherein the scanning probe microscope includes at least one stage actuator for actuating at least one of an object stage or a sensor stage in order to vary a relative distance between the sensor device and a sample, and wherein a controller is provided with one or more control parameters configured to control the at least one stage actuator for keeping the sample at a desired distance with respect to the cantilever, wherein the system includes a system identification unit configured to perform one or more system identification measurements during operation of the control loop, wherein the system identification unit is configured to introduce an excitation signal with a plurality of frequency components in the control loop during the system identification measurement, and to measure a resulting response signal indicative of a cantilever displacement or a stage-sample distance between the sensor device and the sample, wherein a model response function is identified using said excitation signal and said resulting response signal, wherein the system identification unit is further configured to adapt one or more settings and/or input signals in the control loop based on the identified model response function, and wherein the system is configured to use the adapted one or more settings and/or input signals during characterization of the sample by means of the scanning probe microscope.

According to an aspect, the invention provides for a lithographic apparatus comprising the system according to the invention.

According to an aspect, the invention provides for a method of operating a scanning probe microscope wherein a control loop is provided which is configured for controlling one or more operational parameters of the scanning probe microscope, the method including: performing one or more system identification measurements in the control loop, wherein during the one or more system identification measurements a predetermined excitation signal with a plurality of frequency components is introduced in the control loop and a resulting system-dependent response signal is measured, wherein a model response function is identified using said predetermined excitation signal and said resulting system-dependent response signal; and adapting one or more settings and/or input signals in the control loop based on the identified model response function, wherein characterization of a sample by means of the scanning probe microscope is performed using the adapted one or more settings and/or input signals.

According to an aspect, the invention provides for a system for operating a scanning probe microscope, wherein the system includes means for carrying out the method according to the invention.

According to an aspect, the invention provides for a method of operating a scanning probe microscope, wherein a plurality of predefined selectable control loops are provided corresponding to different operation modes of the scanning probe microscope, wherein the method includes selecting one of the plurality of predefined selectable control loops and performing the one or more system identification measurements for the selected control loop.

A specific control loop or control scheme with a corresponding AFM mode can be used depending on the application. The pre-programmed AFM modes can be selected, providing a modular AFM design. The different predefined control loops may provide different AFM modes. The corresponding control loop can be automatically used when a desired AFM mode is selected. Furthermore, one or more additional modulus may be added to the selected control loops.

One of the plurality of different available predefined AFM modes and/or modules can be selected (cf. modular control loop), for instance by an operator of the AFM. When the probe is loaded (and/or replaced), one or more system identification measurements can be performed to select improved controller parameters taking into account changes resulting from loading the (new) probe. In some examples, the selected controller parameters are used until the scan is ready, the probe is worn out, and/or replaced.

In some examples, the control loop can be modular with a plurality of predefined modules which are upon selection activated in the control loop. Examples of the plurality of predefined modules include a top-bottom intensity compensation module, a sensor stage top-bottom compensation module, a phase lock loop module configured for monitoring additional resonances, an excitation frequency correction module, a cantilever damping module or a dither gain crosstalk compensation. Other modules can also be integrated in the control loop, wherein the modules are only activated upon selection. In this way, a modular control architecture for the scanning probe microscopy system can be obtained.

It will be appreciated that the cantilever displacement or cantilever amplitude signal can be described jointly as controller inputs.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner It will be appreciated that any of the aspects, features and options described in view of the method apply equally to the system and the described lithographic apparatus. It will also be clear that any one or more of the above aspects, features and options can be combined.

BRIEF DESCRIPTION OF THE DRAWING

The invention will further be elucidated on the basis of exemplary embodiments which are represented in a drawing. The exemplary embodiments are given by way of non-limitative illustration. It is noted that the figures are only schematic representations of embodiments of the invention that are given by way of non-limiting example.

In the drawing.

DETAILED DESCRIPTION

Figure 1:
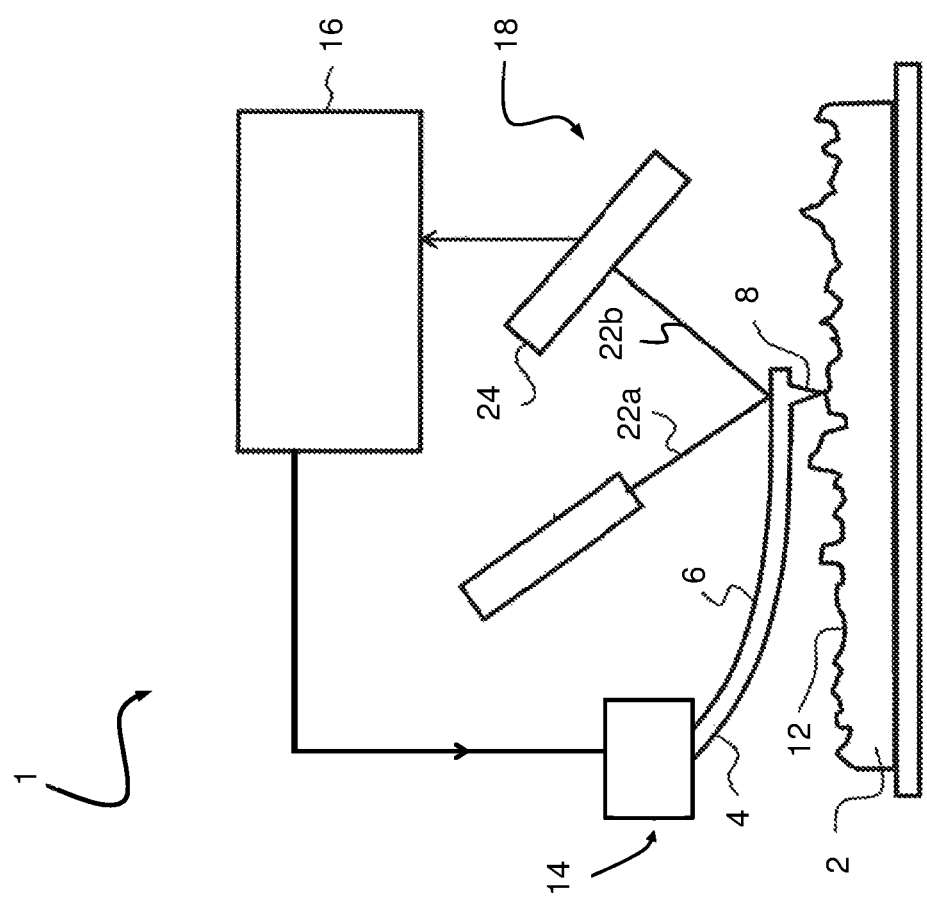
FIG. 1 shows a schematic diagram of an embodiment of a scanning probe microscope.

FIG. 1 shows an exemplary atomic force microscopy system 1 for performing characterization of a sample 2. The system 1 comprises a sensor device 4 (i.e. probe) including a cantilever 6 and a probe tip 8 arranged on the cantilever 6. The system 1 is configured for positioning the probe tip 8 relative to the sample 2. Further, the system 1 comprises an actuator 14 configured to actuate the probe 4 for causing motion of the cantilever 6 and thus the probe tip 8. Different types of actuators 14 can be used, such as for instance piezo-electric actuators, photo-thermal actuators, etc. Further, the system 1 comprises a control system 16 configured to provide a actuation signal to the actuator 14 to induce movement between the probe tip 8 and the sample 2 for enabling interaction or contact between the probe tip 8 and a surface 12 of the sample 2. The system 1 further includes a detector 18 configured to detect a position of the probe tip 8, wherein an output signal indicative of a probe tip motion is obtained by monitoring the probe tip position. The control system 16 is arranged for determining, using the output signal, a surface and/or subsurface characterization data. Different AFM modes are possible.

The output signal can be sensed in different ways. In the shown example of FIG. 1, the position of the probe tip 8 is monitored using an optical detector 18, which is configured to provide an optical sensing beam 22a incident on or near the probe tip 8 and sensing a reflected beam 22b of the optical sensing beam 22a using an optical sensor 24. Hence, the probe tip 8 movements can be monitored using the incident optical beam 22a that is reflected at the probe tip 8 and detected by the optical sensor 24. The motion of the probe tip 8 results in a variation of the reflection angle of the reflected beam 22b, which results in a variation of the location of the reflected beam 22b on the optical sensor 24. This variation on the optical sensor 24 can be detected and analyzed as being the output signal of the system 1.

The control system 16 may include one or more control loops which can be selected depending on the AFM mode in which the AFM is to be operated. According to the invention, system identification measurements are applied wherein a known or determined excitation signal is introduced at one or more locations in a control scheme of the SPM (e.g. AFM), for instance behind the controller arranged for controlling the at least one stage actuator, such that an effect of the introduced excitation signal can be identified. For example, the known or determined injected excitation signal may be added behind the controller which is arranged to control the at least one stage actuator. The effect of the known introduced excitation signal on the measured stage-sample distance can then be determined for identifying the response function of the system. The feedback parameters of the control loop can be operational parameters of the AFM.

The excitation signal used for the one or more system identification measurements preferably includes all the frequency components that are relevant for identifying the controlled system. In this way, it is possible to determine how the AFM and the controller respond to each excited frequency. Potential resonances in the system can be effectively identified. In some examples, noise (e.g. white noise) is used as excitation signal for excitation of all relevant frequencies necessary for adequate system identification measurement. However, other types of signals can also be used, such as for instance a rising sine wave signal, a chirp signal, a sweeping signal, a multi-sine signal, etc. It is also possible to use a signal including a plurality of selected frequency components, for example in sub-set frequency ranges.

Figure 2:
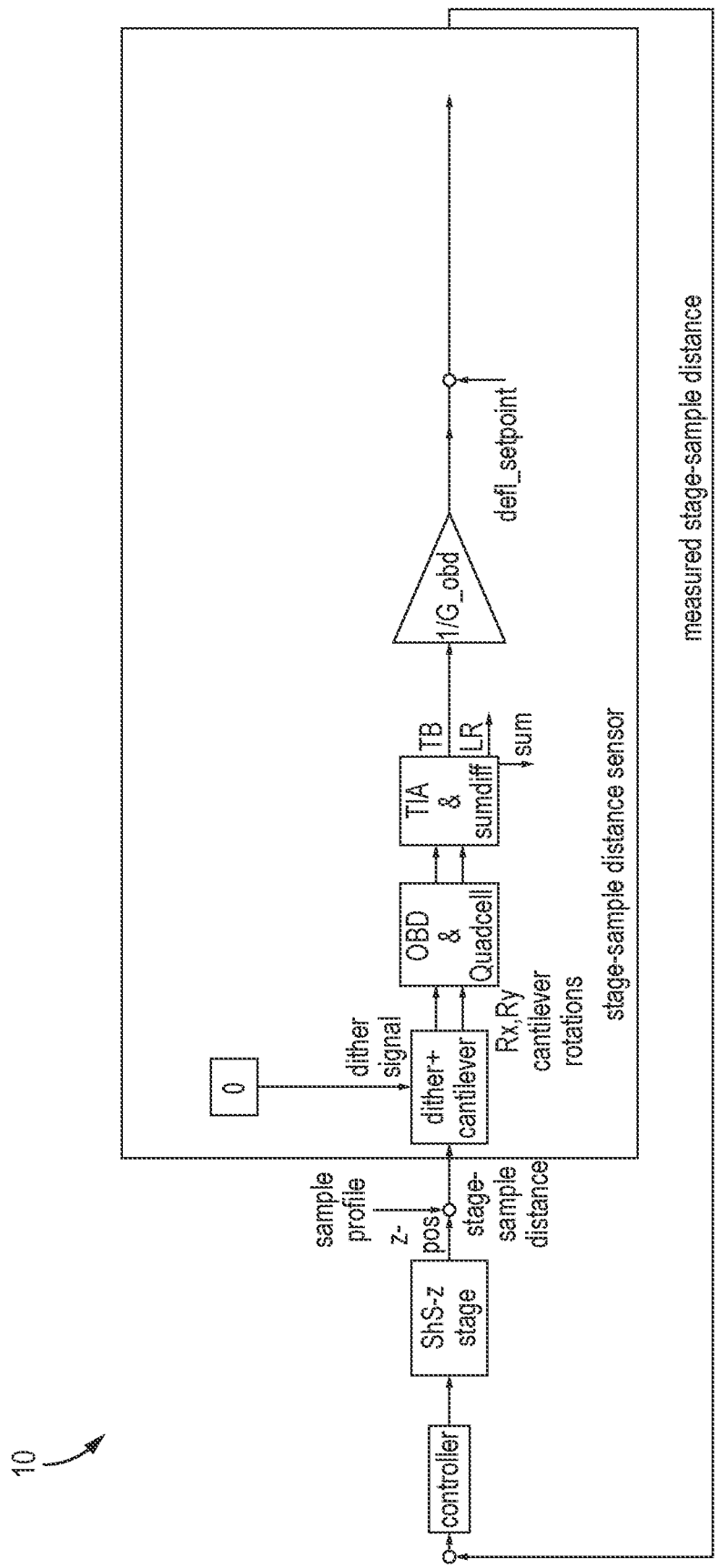
FIG. 2 shows a schematic diagram of an embodiment of a control loop.

FIGS. 2-9 show a schematic diagram of embodiments of a control loop 10. The different control loops provide different ways for estimating the stage-sample distance using the measured cantilever movement. In FIG. 2, a control loop 10 is shown for an AFM mode in which the cantilever is deflected towards the sample surface, such that the probe tip is pushed against the sample surface. This is also known as contact mode AFM. The instantaneous movement of the cantilever can be determined. For example, it is possible to determine to what extent the probe tip rotates. Rotation signals Rx, Ry rotation signals can be measured so that it can be assessed how far away the sample surface is with respect to the cantilever.

Figure 3:
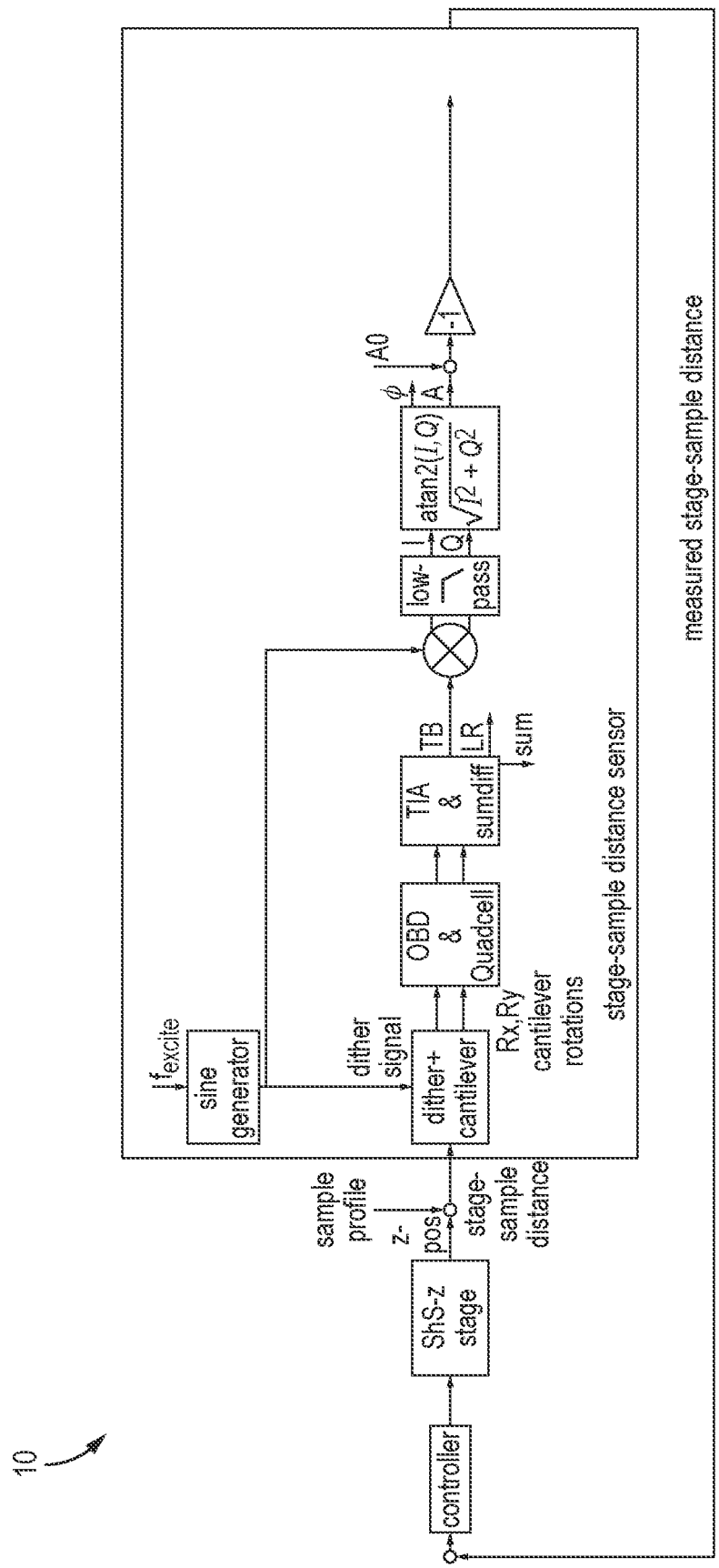
FIG. 3 shows a schematic diagram of an embodiment of a control loop.

In FIGS. 2-3, the controller is configured to keep the distance of the cantilever to the sample surface constant. The control loops as shown in FIGS. 2 and 3 provides for a contact mode AFM and a tapping mode AFM, respectively. The control loop 10 in FIG. 3 provides an AM-mode.

Figure 4:
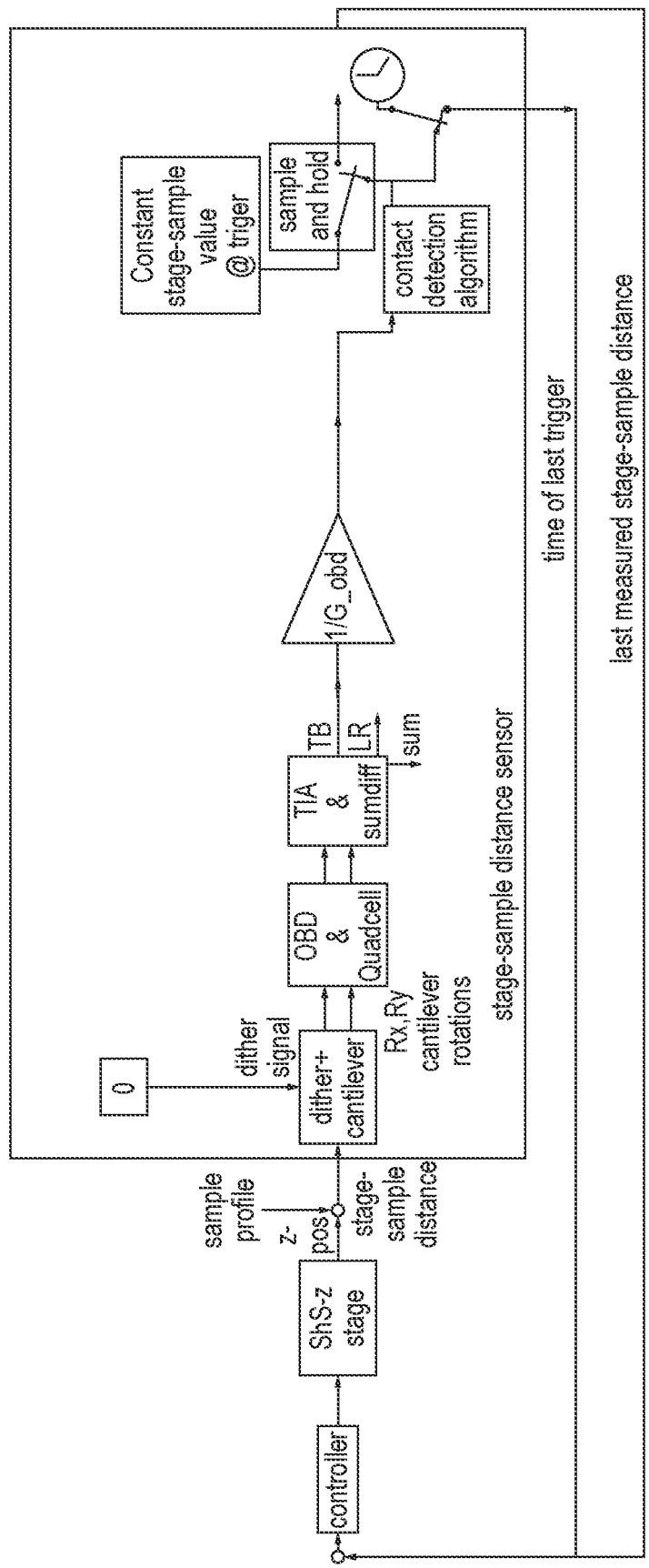
FIG. 4 shows a schematic diagram of an embodiment of a control loop.
Figure 5:
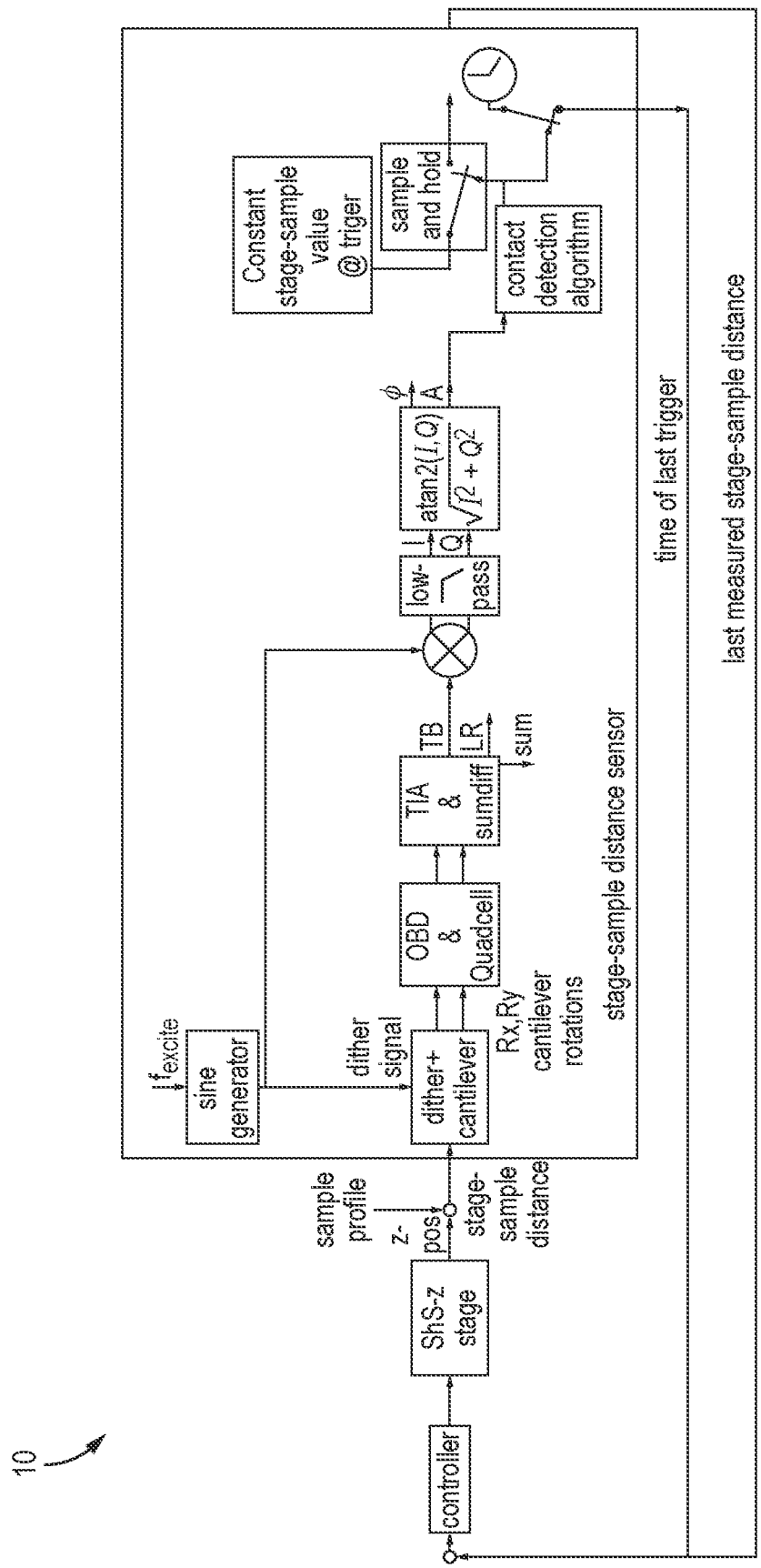
FIG. 5 shows a schematic diagram of an embodiment of a control loop.

In FIGS. 4-5, the controller is configured to periodically move the cantilever towards to the sample (detection and retract mode). As soon as the sample is sensed, a profile measurement is obtained and the cantilever is withdrawn. The moment of contact can trigger the movement of the cantilever away from the sample. Based on an amplitude signal and an instantaneous bending signal TB, a profile can be generated. In FIG. 4, the control loop 10 provides a static contact, and in FIG. 5, the control loop 10 provides a resonant contact detection.

As illustrated in exemplary embodiments of FIG. 4 and FIG. 5 contact between the probe tip and the sample surface can be detected in different ways. In FIG. 4, the top-bottom signal TB (cf. bending direction of the cantilever) is used directly for contact detection. In FIG. 5, the amplitude of the top-bottom signal is used for the contact detection.

Figure 6:
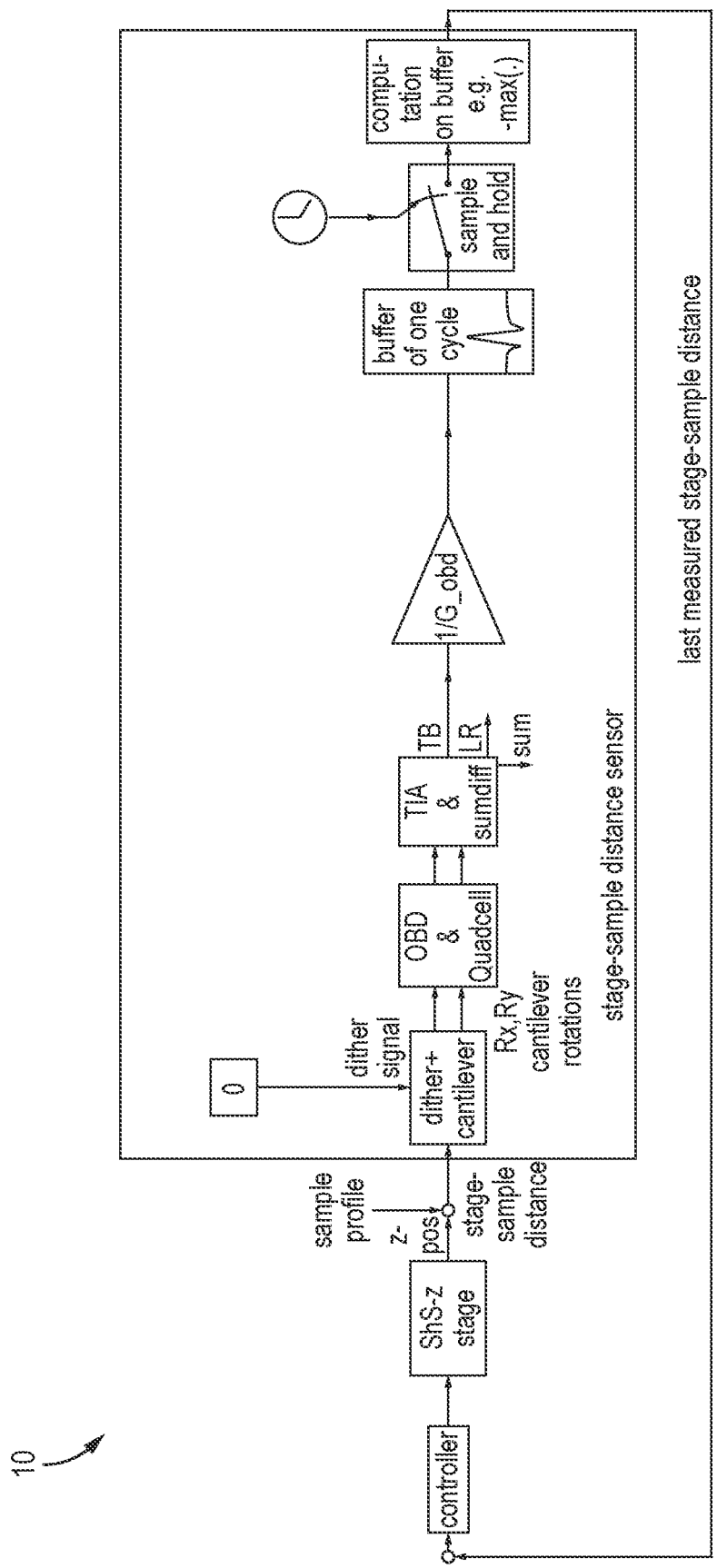
FIG. 6 shows a schematic diagram of an embodiment of a control loop.

In FIG. 6, a control loop 10 for a peak force tapping mode is shown. A periodic signal is offered to the controller and the Z-stage of the AFM. Next, the bending of the cantilever is monitored for a whole period. Once a whole period has been completed, a certain measure is taken (e.g. maximum bending of the cantilever during the cycle) which is considered as a measure for the stage-sample distance. A buffer is filled based on the top-bottom signal to estimate a peak force.

Figure 7:
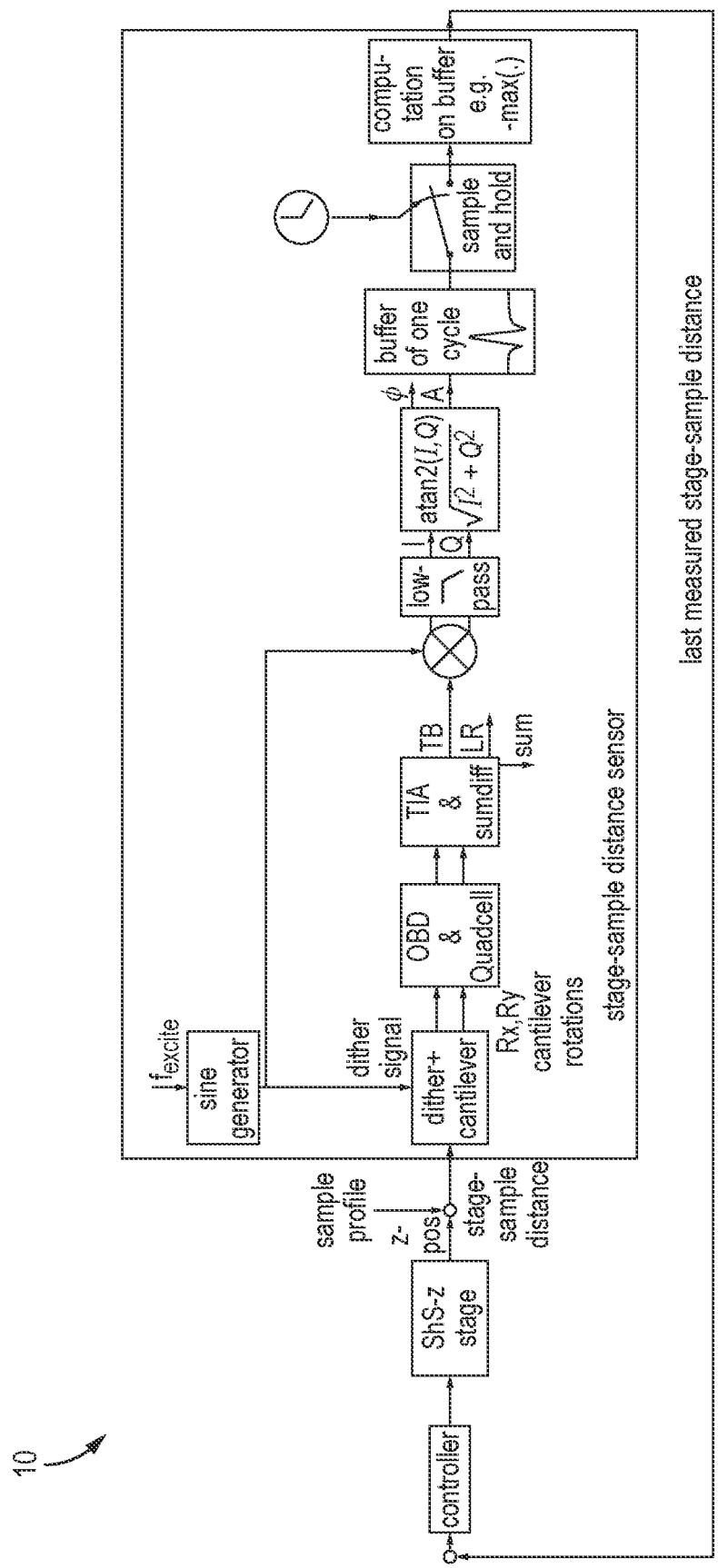
FIG. 7 shows a schematic diagram of an embodiment of a control loop.

In the control loop as shown in FIG. 7, a peak resonant force tapping mode is shown. A profile measurement is made based on amplitude and cantilever resonance and an applied period. The control loop 10 is configured to buffer the amplitude during at least one cycle of a periodic movement of the probe tip, and wherein based on the buffer the stage-sample distance is estimated. During the at least one cycle, a largest contact force in the entire buffered period is determined, wherein the estimate of the stage-sample distance is based on the determined largest contact force.

The controller in the control loop 10 can specify a certain periodic movement. In an example, a whole period is then measured on how the amplitude signal proceeds; and based on this it is calculated whether it is too close to the sample or too far away. In an example, a periodic movement is applied to the probe (moves towards the sample and goes back), then the largest contact force in the entire period is examined. And the largest contact force can be a measure of the stage-sample distance. Based on this identified largest contact force, the control loop can be looped back.

Advantageously, system identification can be performed during the operation of the control loop. The probe is first brought near the sample and then the system is identified including the probe sample interaction. The control loop can remain closed and an extra signal (excitation signal) is added.

Figure 8:
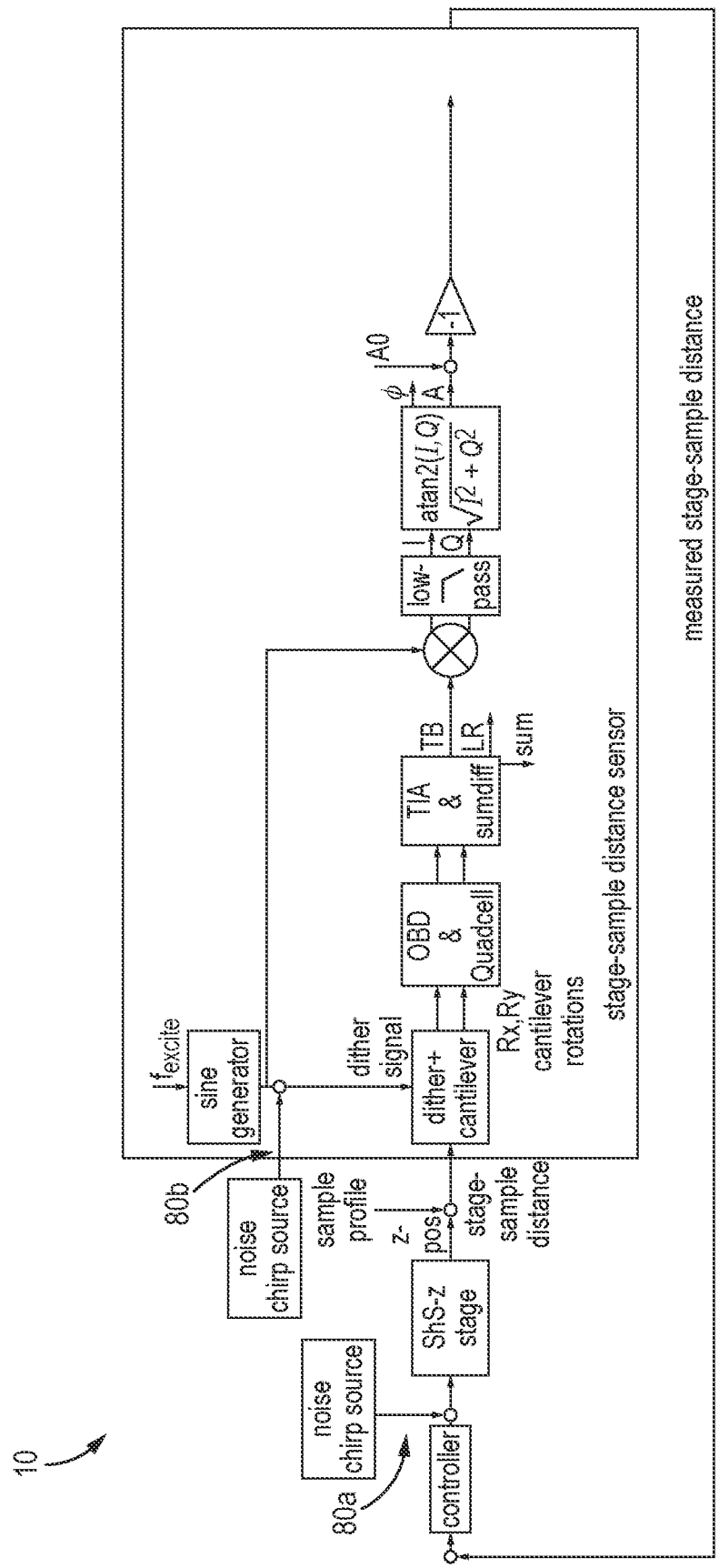
FIG. 8 shows a schematic diagram of an embodiment of a control loop.

In FIG. 8, the embodiment as shown in FIG. 3 is shown with additionally injection of predetermined excitation signals for system identification. Similar addition of predetermined excitation signals can also be employed in the other embodiments as shown in FIGS. 2-9. This way of performing system identification measurements can be used for various AFM modes (cf. different control loops implementing the AFM modes).

It will be appreciated that it is also possible to analyze how the cantilever vibrates. An actuator signal can be applied (e.g. via a dither) to make the cantilever vibrate. The vibration can be influenced by the sample profile, i.e. probe-sample interaction. A known dither signal, e.g. harmonic signal, can be applied for actuation. Subsequently, a value indicative of the displacement (rotation) of the probe tip can be measured, for example the amplitude of the signal at the frequency at which the cantilever is excited can be considered. This response amplitude can be used as a measure of the distance of the cantilever relative to the sample profile.

When the probe is brought into contact with the sample, an additional excitation signal can be applied to the cantilever. Depending on how the amplitude responds to this additional excitation signal, it can be determined whether it is needed to excite a different frequency in order to obtain a desired amplitude. For example, if the amplitude has decreased, it can be deduced from the system identification that the resonance frequency of the probe has shifted. Based on the system identification measurements, the signals from the sine wave generator can be adjusted for obtaining the desired amplitude.

For the six different AFM modes linked to the embodiments as shown in FIGS. 2-9 the system identification may for example be performed in a same manner as for the embodiment of FIG. 8. For each of the pre-defined control loops, the one or more system identification measurements can be performed for changing one or more control settings (e.g. controller parameters) and/or input signals. Advantageously, the selected control loop can be automatically tuned taking into account the model response function.

For example, the embodiment of FIG. 2 may result in a rather large contact force which can cause the probe to scratch. By means of the embodiments as shown in FIGS. 3, 4, 6 and 7, an equally sensitive measurement can be obtained with lower contact forces or faster measurements. Hence, an adequate AFM mode can be chosen by selecting a corresponding pre-defined control loop. A modular design of the control loops can be obtained in this way. As can be seen in FIGS. 2-8, different AFM modes can be provided by different control loops.

The one or more system identification measurements can be effectively performed for the selected AFM modes in the modular design. The control loops linked to the AFM modes can be pre-configured. The present invention provides additional advantages when a modular AFM system is employed, wherein different pre-defined AFM modes are selectable. By means of the system identification methods, the adequate settings and/or input signals in the control loop can be automatically identified. In this way, the control performance of the control loops can be increased, even if a large number of predefined AFM modes are selectable.

Figure 11:
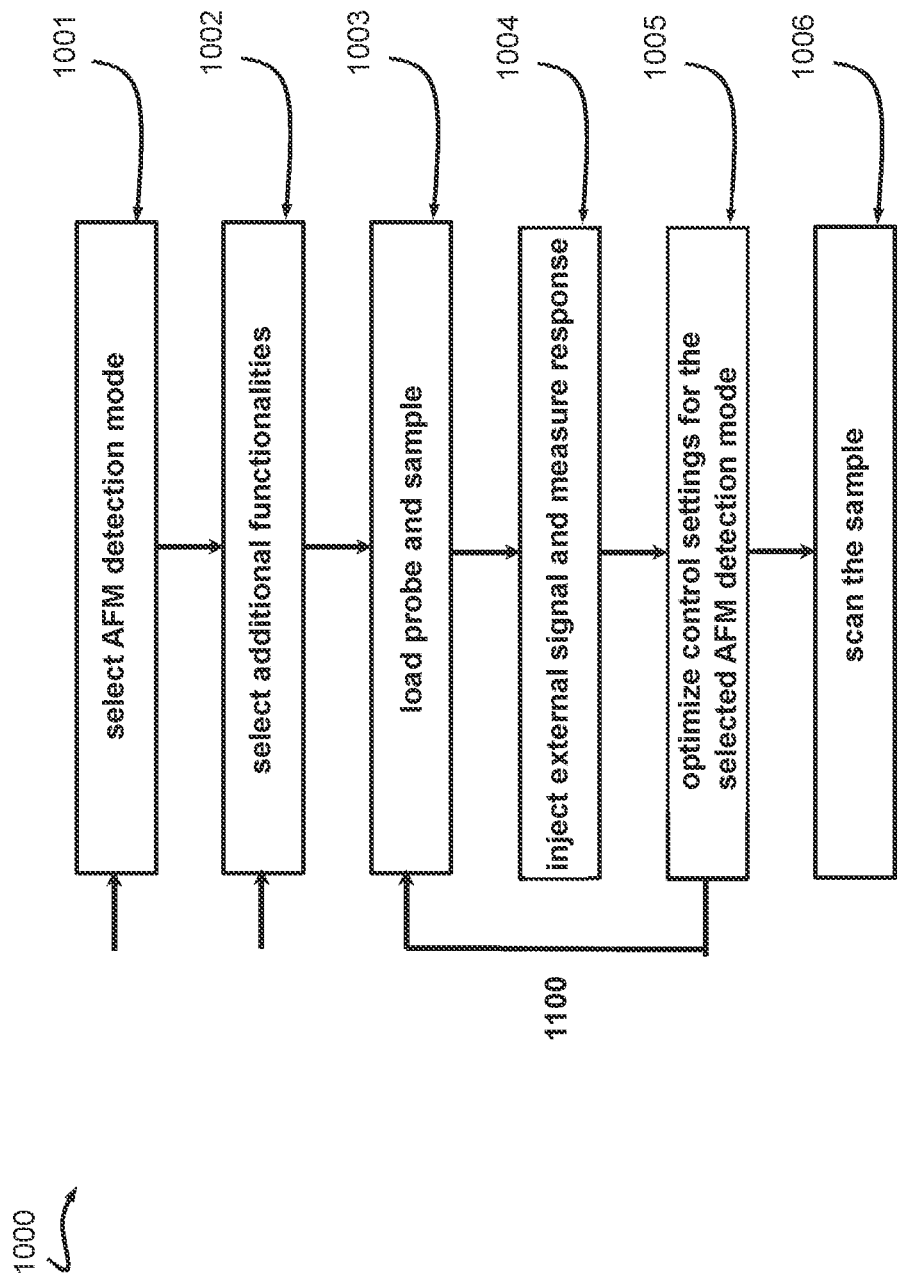
FIG. 11 shows a schematic diagram of a method for a method of operating a scanning probe microscope.

Advantageously, the one or more system identification measurements can be carried out after a probe change or probe mounting (cf. FIG. 11). However, it is also possible to systematically perform the one or more system identification measurements even when the same probe is mounted in order to identify how the system has changed over time and adjust controller parameters and/or input signals accordingly. For example, if the system model response function has changed, an error detection signal can be derived from it for adjusting one or more controller parameters of the controller.

In FIG. 8 a noise/chirp signal 80a is introduced downstream of the controller at the output of the controller, for a first system identification measurement, and a second noise/chirp source 80b is introduced downstream of the sine generator at the output of the sine generator for a second system identification measurement. It will be appreciated that other excitation signals may also be used.

Figure 9:
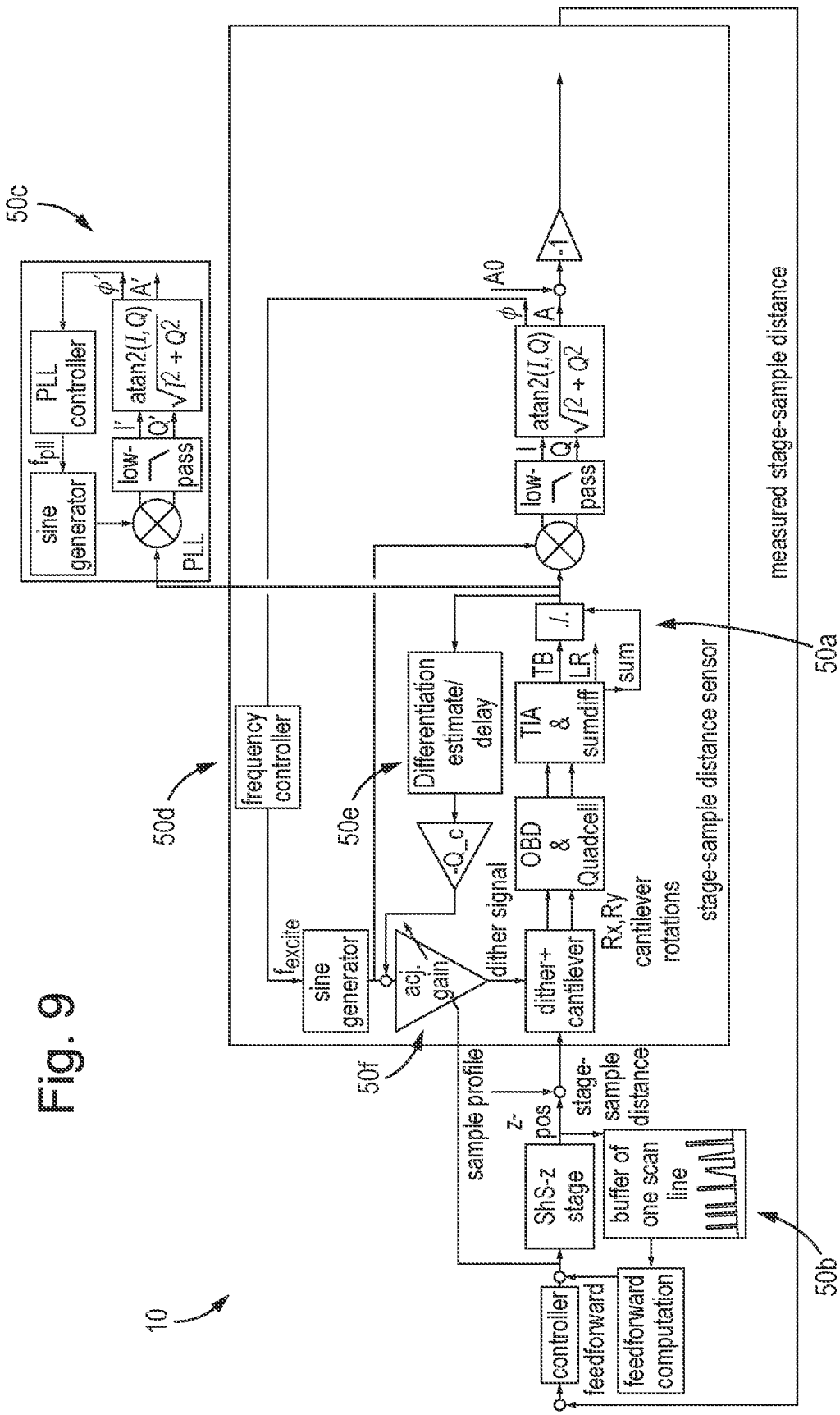
FIG. 9 shows a schematic diagram of an embodiment of a control loop.

FIG. 9 shows a schematic diagram of an embodiment of a control loop 10 with a plurality of modulus 50a, 50b, 50c, 50d, 50e, 50f. The control loop 10 has a modular design, wherein the plurality of predefined modules can be activated in the control loop upon selection.

The modular control loop 10 may include other selectable modules not shown in this example. The exemplary modules as depicted in FIG. 9 can also be added to the control loops 10 as shown in FIGS. 2-8. The modules may be optional selectable additions that an AFM operator may for instance choose from.

The first optionally selectable module 50a relates to top-bottom (TB) intensity compensation. The bending of the cantilever is measured by directing a laser on top of the cantilever. Depending on how the cantilever is bent, the reflected laser may deflect more up or down (cf. top-bottom TB). This value is measured in the AFM. However, in some cases, a variation in the laser intensity may be present. If all signals are collected, then a measurement of the total laser intensity on the sensor (summed signal) can be made. The top-bottom (TB) signal can be divided by the summed signal of the total laser intensity in order to get a better estimate of the bend of the cantilever.

The second optionally selectable module Sob relates to a sensor stage top-bottom compensation (Z-stage feedforward). In some cases, a plurality of parallel lines are scanned periodically over the sample. A next line may result in almost a same profile as the previous line. A feedforward may be arranged using a previous signal so as to have less error corrected by the controller. In this way, the error can be significantly reduced. Furthermore, it is possible to move faster with reduced risk of a significant error occurring in the control loop.

The third optionally selectable module 50c relates to a phase lock loop. The phase lock loop may be configured to monitor additional resonances. The phase-lock loop can generate an output signal whose phase is related to the phase of an input signal. Keeping the input and output phase in lock step, also implies keeping the input and output frequencies the same. The phase-lock loop enables following a frequency within the system. For example, if the bending frequency is excited, but also the cantilever rotation is of interest, then frequency and amplitude of response can be estimated by means of the phase-lock loop.

The fourth optionally selectable module 50d relates to an excitation frequency correction. The cantilever can be actuated with an actuation signal including a predetermined frequency (frequency controller). Advantageously, by looking at the phase of the response signal, the cantilever frequency can be better estimated in order to get a maximum response.

The fifth optionally selectable module 50e relates to a cantilever damping module. An estimate can be made of the movement of the cantilever and additionally damping can be added. As a result of the added damping, the actuation of the cantilever can be reduced at certain frequencies. If a specific resonance is desired, but the cantilever suddenly resonates much louder, then not much actuation may be required. Advantageously, a constant resonance amplitude can be obtained, wherein the damping is dynamically varied in order to compensate for variations. In this way, a much stronger damping can be obtained, so that a sample profile variation can be followed faster. In some examples, an additional damping can be added to the control loop based on the measured bending of the cantilever.

The sixth optionally selectable module 50f relates to a dither gain crosstalk compensation. Crosstalk is an unwanted contribution in amplitude of the dither signal through the output of the controller. An adjustable gain may be provided to the dither actuation signal for compensating crosstalk. The amplitude of the dither actuation signal (cf. actuation signal on the cantilever) can for instance be adjusted depending on the position of the Z-stage. As a result, sensitivity to the position of the cantilever can be compensated for.

The SPM can be analyzed using a modular control scheme whose characteristics are identified using automated frequency response measurements to optimally tune the SPM for the required task. The modularity of the control scheme allows to balance complexity and performance of the SPM. The automated implementation of this procedure eliminates the need for skilled operator and maximizes reliability and reproducibility. Furthermore, it can allow fast and optimal tuning of the SPM for each sample and probe combination.

Figure 10:
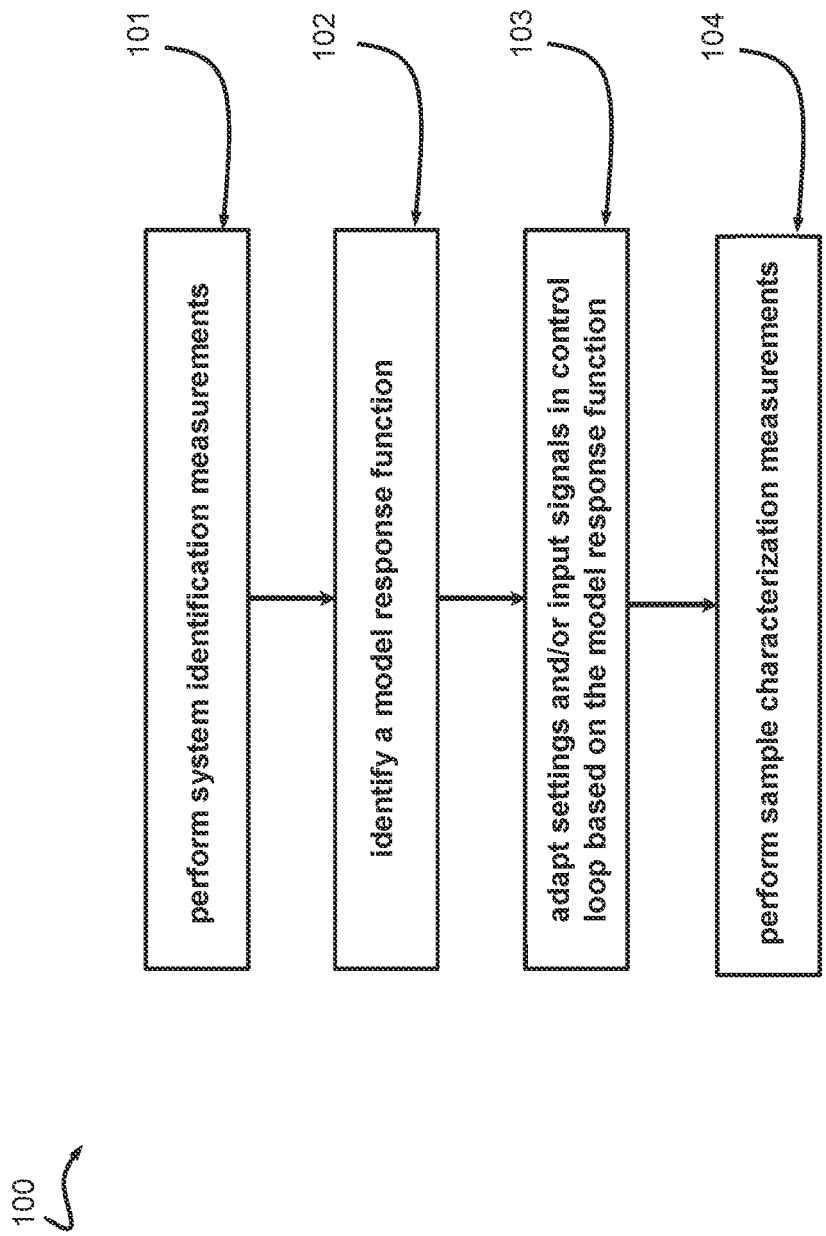
FIG. 10 shows a schematic diagram of a method for a method of operating a scanning probe microscope.

FIG. 10 shows a schematic diagram of a method for a method of operating a scanning probe microscope 100, wherein a control loop is provided which is configured for controlling one or more feedback parameters of the scanning probe microscope, wherein the scanning probe microscope comprises a sensor device including a cantilever having a probe tip, wherein the scanning probe microscope includes at least one stage actuator for actuating at least one of an object stage or sensor stage in order to vary a relative distance between the sensor device and a sample, and wherein a controller is provided with one or more control parameters configured to control the at least one stage actuator for keeping the sample at a desired distance with respect to the cantilever. In a first step 101, one or more system identification measurements are performed during operation of the control loop, wherein during the one or more system identification measurements an excitation signal with a plurality of frequency components is introduced in the control loop and a resulting response signal indicative of a cantilever displacement or a stage-sample distance between the sensor device and the sample is measured. In a second step 102, a model response function is identified using said excitation signal and said resulting response signal. In a third step 103, one or more settings and/or input signals in the control loop are adapted or adjusted based on the identified model response function. In a fourth step 104, characterization measurements are performed by scanning the sample wherein the adapted one or more settings and/or input signals are used.

In some advantageous examples, the autotuning is performed using frequency-based response functions. In this way improved measurement precision, reliability and throughput can be obtained. Based on a frequency-response at fixed location on either a calibration sample or the sample of interest, the control system can be better tuned. Additionally or alternatively, the frequency response can be measured after each probe and sample change. Additionally or alternatively, the modularity of control scheme with optional performance-enhancing functionalities (cf. modules) are not limited by the frequency-response based system identification techniques.

FIG. 11 shows a schematic diagram of a method for a method of operating a scanning probe microscope. In a first step 1001, an AFM detection mode can be selected, for instance based on a manual operator input. The selected AFM detection mode may correspond to a predefined control loop. In a second step 1002, one or more additional functionalities can be selected, for instance based on a manual operator input. The additional functionalities may be obtained by means of selectable modulus which can be activated in the selected control loop 10. In a third step 1003, the probe and sample can be loaded. In a fourth step 1004, an external signal can be injected and a (frequency) response can be measured. In a fifth step 1005, control settings can be optimized for the selected AFM mode and additional modules/functionalities in the control loop 10. In a sixth step 1006, the sample can be scanned. In step 1100, optionally, if a next sample is loaded, a probe is worn out, a probe is replaced, and/or a next sample location is used, the previous steps 1003-1005 can be repeated. Advantageously no manual intervention is needed for optimization of the control settings. In step 1006, the process can be stopped. It will be appreciated that configuring the control parameters can be performed in an automated way. Hence, steps 1003-1006 can be repeated.

For example, if there is a large resonance in the system, it can be desired to prevent excitation of the resonance by the controller. Advantageously, by means of the identified response function, instability can be prevented in setting the controller parameters. In some examples, a filter is employed effectively filtering out certain frequencies.

In an advantageous way, it can become unnecessary for the AFM operator to manually adjust one or more input signals and/or control settings of the controller. As a result, scanning can continue automatically with improved control parameters and/or input signals.

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either or all of the listed items. The use of "including," "comprising," or "having," and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, the term "controller" may include either a single component or a plurality of components, which are either active and/or passive and are connected or otherwise coupled together (for example, as one or more integrated circuit chips) to provide the described function.

It will be appreciated that the method may include computer implemented steps. All above mentioned steps can be computer implemented steps. Embodiments may comprise computer apparatus, wherein processes performed in computer apparatus. The invention also extends to computer programs, particularly computer programs on or in a carrier, adapted for putting the invention into practice. The program may be in the form of source or object code or in any other form suitable for use in the implementation of the processes according to the invention. The carrier may be any entity or device capable of carrying the program. For example, the carrier may comprise a storage medium, such as a ROM, for example a semiconductor ROM or hard disk. Further, the carrier may be a transmissible carrier such as an electrical or optical signal which may be conveyed via electrical or optical cable or by radio or other means, e.g. via the Internet or cloud.

Some embodiments may be implemented, for example, using a machine or tangible computer-readable medium or article which may store an instruction or a set of instructions that, if executed by a machine, may cause the machine to perform a method and/or operations in accordance with the embodiments.

Various embodiments may be implemented using hardware elements, software elements, or a combination of both. Examples of hardware elements may include processors, microprocessors, circuits, application specific integrated circuits (ASIC), programmable logic, devices (PLD), digital signal processors (DSP), field programmable gate array (FPGA), logic gates, registers, semiconductor device, microchips, chip sets, et cetera. Examples of software may include software components, programs, applications, computer programs, application programs, system programs, machine programs, operating system software, mobile apps, middleware, firmware, software modules, routines, subroutines, functions, computer implemented methods, procedures, software interfaces, application program interfaces (API), methods, instruction sets, computing code, computer code, et cetera.

Herein, the invention is described with reference to specific examples of embodiments of the invention. It will, however, be evident that various modifications, variations, alternatives and changes may be made therein, without departing from the essence of the invention. For the purpose of clarity and a concise description features are described herein as part of the same or separate embodiments, however, alternative embodiments having combinations of all or some of the features described in these separate embodiments are also envisaged and understood to fall within the framework of the invention as outlined by the claims. The specifications, figures and examples are, accordingly, to be regarded in an illustrative sense rather than in a restrictive sense. The invention is intended to embrace all alternatives, modifications and variations which fall within the spirit and scope of the appended claims. Further, many of the elements that are described are functional entities that may be implemented as discrete or distributed components or in conjunction with other components, in any suitable combination and location.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A method of operating a scanning probe microscope wherein a control loop is provided that is configured for controlling one or more feedback parameters of the scanning probe microscope, wherein the scanning probe microscope comprises a sensor device including a cantilever having a probe tip, wherein the scanning probe microscope includes at least one stage actuator for actuating at least one of an object stage or sensor stage to vary a relative distance between the sensor device and a sample, and wherein a controller is provided with one or more control parameters configured to control the at least one stage actuator for keeping the sample at a desired distance with respect to the cantilever, the method including:
    performing one or more system identification measurements during operation of the control loop, wherein during the one or more system identification measurements:
        an excitation signal having a plurality of frequency components is introduced in the control loop, and
        a resulting response signal indicative of a cantilever displacement or a stage-sample distance between the sensor device and the sample is measured,
        wherein a model response function is identified using said excitation signal and said resulting response signal; and
    adapting, based on the model response function, one or more settings and/or input signals in the control loop,
    wherein a characterization of the sample by the scanning probe microscope is performed using the one or more settings and/or input signals adapted during the adapting operation.

2. The method according to claim 1, wherein during a first system identification measurement, a first excitation signal with a plurality of frequency components is added downstream of the controller at a controller output signal,
    wherein a first model response function is identified using the added first excitation signal and a measured first response signal indicative of the stage-sample distance between the sensor device and the sample, and
    wherein the one or more control parameters of the controller are adjusted based on the identified first model response function obtained by the first system identification measurement.

3. The method according to claim 2, wherein the method further includes providing a periodic actuation signal to the sensor device using a probe actuator for inducing periodic movement between the probe tip and the sample during scanning of a surface of the sample with the probe tip,
    wherein, during a second system identification measurement, a second excitation signal having a plurality of frequency components is added downstream of the probe actuator at an actuator output signal of the probe actuator, and
    wherein a second model response function is identified using:
        the added second excitation signal, and
        a measured second response signal indicative of a displacement of the probe tip of the sensor device,
        wherein the identified second model response function is used for adapting the actuation signal provided to the sensor device for characterization of the sample.

4. The method according to claim 3, wherein the first and second model response functions are identified successively.

5. The method according to claim 3, wherein the first model response and second model response are identified at least partially concurrently,
    wherein the first excitation signal includes frequency components up to 250 kHz, and
    wherein the second excitation signal includes frequency components in a range of 75 kHz to 10 MHz.

6. The method according to claim 3, wherein:
the first excitation signal includes frequency components from 0.05 to 2 times a lowest resonance frequency of the sensor stage, and/or
the second excitation signal includes frequency components in a range of 0.01-10 times a first resonance frequency of the cantilever.

7. The method according to claim 2, wherein the controller is tuned based on the identified first model response function.

8. The method according to claim 1, wherein the one or more system identification measurements are employed for performing automatic tuning of the control loop that is utilized for controlling the one or more feedback parameters of the scanning probe microscope.

9. The method according to claim 1, wherein the method further includes providing a periodic actuation signal to the sensor device using a probe actuator for inducing periodic movement between the probe tip and the sample during scanning of a surface of the sample with the probe tip,
wherein, during a second system identification measurement, a second excitation signal having a plurality of frequency components is added downstream of the probe actuator at an actuator output signal of the probe actuator, and
wherein a second model response function is identified using:
the added second excitation signal, and
a measured second response signal indicative of a displacement of the probe tip of the sensor device,
wherein the identified second model response function is used for adapting the actuation signal provided to the sensor device for characterization of the sample, and
wherein the actuation signal is tuned based on the identified second model response function.

10. The method according to claim 1, wherein a plurality of predefined selectable control loops are provided corresponding to different operation modes of the scanning probe microscope,
wherein the method includes:
selecting one of the plurality of predefined selectable control loops, and
performing the one or more system identification measurements for the selected control loop.

11. The method according to claim 1, wherein the control loop is modular and has a plurality of predefined modules that are upon selection activated in the control loop.

12. The method according to claim 11, wherein the plurality of predefined modules include at least one of the group consisting of:
a top-bottom intensity compensation module,
a sensor stage top-bottom compensation module,
a phase lock loop module configured for monitoring additional resonances,
an excitation frequency correction module,
a cantilever damping module, and
a dither gain crosstalk compensation.

13. The method according to claim 1, wherein the control loop is configured to buffer an amplitude during at least one cycle of a periodic movement of the probe tip, and
wherein, based on the buffered amplitude, the stage-sample distance is estimated.

14. The method according to claim 13, wherein during the at least one cycle, a largest contact force in an entire buffered period is determined, wherein the estimate of the stage-sample distance is based on the determined largest contact force.

15. The method according to claim 1, wherein one or more system identification measurements are carried out after a change of at least one of the probe tip or the sample.

16. The method according to claim 1, wherein the introduced excitation signal is one or more signal types taken from the group consisting of: a generated noise signal, a chirp signal, and multi-sine signal.

17. The method according to claim 1, wherein the excitation signal and the resulting response signal are transformed into frequency domain, and
wherein the identified model response function is a frequency response function.

18. A scanning probe microscope system including a control loop configured to control one or more feedback parameters, the system comprising:
a sensor device including a cantilever having a probe tip;
at least one stage actuator for actuating at least one of an object stage or a sensor stage to vary a relative distance between the sensor device and a sample;
a controller provided with one or more control parameters configured to control the at least one stage actuator for keeping the sample at a desired distance with respect to the cantilever;
a system identification unit configured to perform one or more system identification measurements during operation of the control loop,
wherein the system identification unit is configured to:
introduce an excitation signal having a plurality of frequency components in the control loop during the system identification measurement, and
measure a resulting response signal indicative of a cantilever displacement or a stage-sample distance between the sensor device and the sample,
wherein a model response function is identified using said excitation signal and said resulting response signal, and
wherein the system identification unit is further configured to:
adapt, based on the identified model response function, one or more settings and/or input signals in the control loop; and
wherein the scanning probe microscope system is configured to use the adapted one or more settings and/or input signals during characterization of the sample by the scanning probe microscope.

19. A lithographic apparatus comprising a scanning probe microscope system including a control loop configured to control one or more feedback parameters, the scanning probe microscope system comprising:
a sensor device including a cantilever having a probe tip;
at least one stage actuator for actuating at least one of an object stage or a sensor stage to vary a relative distance between the sensor device and a sample;
a controller provided with one or more control parameters configured to control the at least one stage actuator for keeping the sample at a desired distance with respect to the cantilever;
a system identification unit configured to perform one or more system identification measurements during operation of the control loop,
wherein the system identification unit is configured to:
introduce an excitation signal having a plurality of frequency components in the control loop during the system identification measurement, and
measure a resulting response signal indicative of a cantilever displacement or a stage-sample distance between the sensor device and the sample, wherein a model response function is identified using said excitation signal and said resulting response signal, and wherein the system identification unit is further configured to:
   adapt, based on the identified model response function, one or more settings and/or input signals in the control loop; and wherein the scanning probe microscope system is configured to use the adapted one or more settings and/or input signals during characterization of the sample by the scanning probe microscope.

\* \* \* \* \*